(12) United States Patent
Pauker

(10) Patent No.: US 11,541,915 B2
(45) Date of Patent: Jan. 3, 2023

(54) BOARDING ASSEMBLY, RAILWAY VEHICLE COMPRISING A BOARDING ASSEMBLY, AND METHOD FOR PRODUCING A RAILWAY VEHICLE

(71) Applicant: STADLER RHEINTAL AG, St. Margrethen (CH)

(72) Inventor: Juergen-M. Pauker, Stumm (AT)

(73) Assignee: Stadler Rheintal AG, St. Margrethen (CH)

( * ) Notice: Subject to any disclaimer, the term of this patent is extended or adjusted under 35 U.S.C. 154(b) by 573 days.

(21) Appl. No.: 16/499,443

(22) PCT Filed: Apr. 12, 2017

(86) PCT No.: PCT/EP2017/058859
§ 371 (c)(1),
(2) Date: Sep. 30, 2019

(87) PCT Pub. No.: WO2018/188744
PCT Pub. Date: Oct. 18, 2018

(65) Prior Publication Data
US 2020/0055528 A1 Feb. 20, 2020

(51) Int. Cl.
*B61D 23/00* (2006.01)
*B61D 23/02* (2006.01)
*B60R 3/02* (2006.01)

(52) U.S. Cl.
CPC .............. *B61D 23/025* (2013.01); *B60R 3/02* (2013.01)

(58) Field of Classification Search
CPC .......... B60R 3/02; B61D 23/025; B61D 23/02
See application file for complete search history.

(56) References Cited

U.S. PATENT DOCUMENTS 4,168,134 A * 9/1979 Pohl .......................... B60R 3/02
105/445
4,216,725 A 8/1980 Hallam
(Continued)

FOREIGN PATENT DOCUMENTS

DE 1 089 644 9/1960
DE 44 07 868 A1 9/1995
(Continued)

OTHER PUBLICATIONS

International Search Report Corresponding to PCT/EP2017/058859 dated Jan. 5, 2018.
(Continued)

*Primary Examiner* — Hau V Phan
(74) *Attorney, Agent, or Firm* — Finch & Maloney PLLC

(57) ABSTRACT

A boarding assembly (1) for boarding a vehicle (2), wherein, in a mounted state, the assembly is arranged outside the vehicle body (4) on a vehicle body outer wall. The boarding assembly (1) comprises at least one first step (10), which is suspended in the boarding assembly (1) such that the first step can rotate about a first axis of rotation. The boarding assembly (1) also comprises a pivot device (20) having a second axis of rotation (22), running substantially parallel to the vehicle body outer wall in the mounted state. The pivot device (20) is arranged entirely on the outside of the vehicle body outer wall, in particular within the boarding assembly (1), in the mounted state.

20 Claims, 4 Drawing Sheets

(56) References Cited

U.S. PATENT DOCUMENTS

Figure 1:
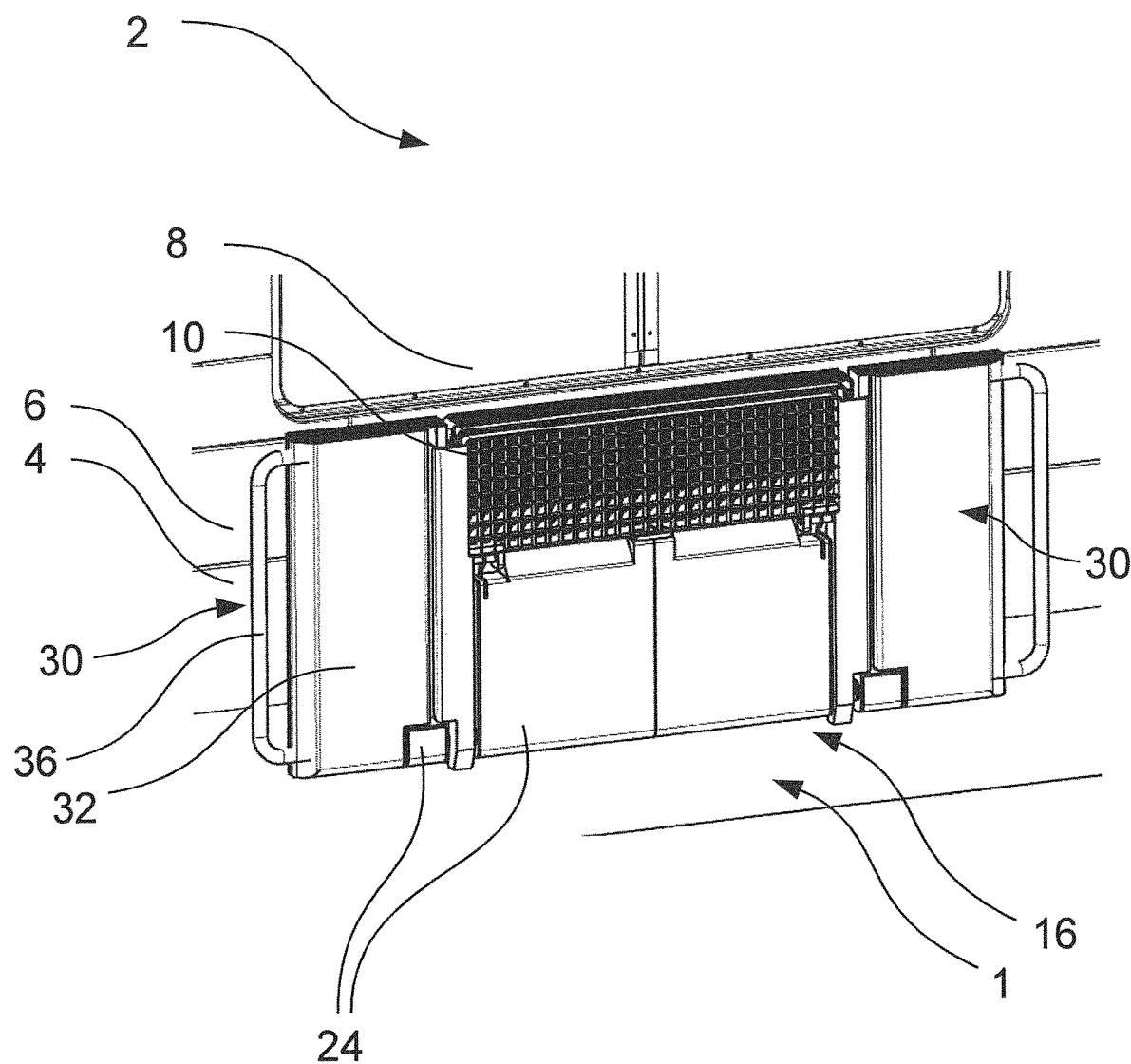

| | | | | |
|---|---|---|---|---|
| 4,583,466 A | * | 4/1986 | Reddy | A61G 3/068 |
| | | | | 105/443 |
| 4,606,433 A | * | 8/1986 | Smalley | B60R 3/00 |
| | | | | 280/166 |
| 5,149,246 A | * | 9/1992 | Dorn | A61G 3/062 |
| | | | | 414/921 |
| 5,280,934 A | | 1/1994 | Monte | |
| 5,425,615 A | * | 6/1995 | Hall | B60R 3/02 |
| | | | | 280/166 |
| 5,941,342 A | * | 8/1999 | Lee | B60R 3/02 |
| | | | | 182/95 |
| 7,111,858 B2 | * | 9/2006 | Manser | B60R 3/02 |
| | | | | 182/127 |
| 8,246,063 B1 | * | 8/2012 | Rowland | B60R 3/02 |
| | | | | 280/166 |
| 2015/0001005 A1 | * | 1/2015 | Goodson | A47B 77/00 |
| | | | | 182/96 |
| 2016/0152188 A1 | * | 6/2016 | Handschke | B60R 3/02 |
| | | | | 280/166 |

FOREIGN PATENT DOCUMENTS

| | | |
|---|---|---|
| EP | 1 857 341 A1 | 11/2007 |
| GB | 2 270 948 A | 3/1994 |

OTHER PUBLICATIONS

Written Opinion Corresponding to PCT/EP2017/058859 dated Jan. 5, 2018.

* cited by examiner

BOARDING ASSEMBLY, RAILWAY VEHICLE COMPRISING A BOARDING ASSEMBLY, AND METHOD FOR PRODUCING A RAILWAY VEHICLE

The invention relates to a boarding assembly for boarding a vehicle, a railway vehicle comprising a boarding assembly, and a method for producing a railway vehicle according to the preamble to the independent claims.

It is known in the case of boarding assemblies for vehicles that these should be suitable for the operation of boarding platforms of different heights, because the heights of the boarding platforms can vary in a single country and in particular in international traffic. It is known, in particular, that vehicles must be retrofitted with a boarding assembly to permit their arrival at a boarding platform situated at a lower level.

A folding step for a railway vehicle is known, for example, from DE 4407868 A1. The folding step is positioned on the carriage body longitudinal member underneath the door of the railway vehicle. A step is supported on a sliding carriage in such a way that it is able to rotate, whereby said carriage is capable of rotating from a travel position that is parallel to the carriage wall into a use position that is perpendicular to the carriage wall. The folding step further comprises a positioning piston having a positioning cylinder, wherein the positioning cylinder is supported on the base frame of the carriage body and is guided to the step through a recess in the carriage body longitudinal member. The step is capable of displacement by means of the positioning cylinder and the positioning piston from the travel position into the use position, and from the use position into the travel position.

A disadvantage of this folding step is that it is arranged only partially on the outside of the carriage body longitudinal member. It is particularly disadvantageous that the positioning piston is guided through the carriage body longitudinal member. The carriage body longitudinal member must contain a recess for the passage of the positioning piston and as such must be configured specifically for the folding step. The retrospective installation of the folding step is accordingly not possible without costly and time-consuming modifications to the vehicle.

A further folding step is known from EP 1 857 341 B1 is. The folding step is arranged externally, on the side of the railway vehicle underneath the door. It is capable of being rotated from a travel position, in which the step is oriented parallel to the carriage body side wall, into a use position, in which the step is oriented perpendicularly to the side wall.

A disadvantage of this folding step is that the step is capable of being displaced only by directly taking hold of the step, as a consequence of which it can be pivoted only with great difficulty.

A folding stairway at the head of a railway vehicle is known from GB 2 270 948 A. The stairway comprises a number of steps and is capable of being rotated from a travel position, in which the stairway is oriented perpendicularly to the railway vehicle wall, into a use position, in which the stairways are usable.

A disadvantage is that the stairway is arranged partially within the vehicle, and the vehicle must therefore make space available to accommodate the stairway. It is not possible, furthermore, to install the stairway on the vehicle retrospectively, that is to say by retrofitting, without the need for costly and time-consuming modifications.

The object of the present invention is to make available a boarding assembly for a vehicle which avoids the disadvantages of the prior art, and, in particular, to make available a boarding assembly, a railway vehicle comprising a boarding assembly and a method for producing a railway vehicle, in which the boarding assembly is configured as a structural unit entirely independently of the railway vehicle and as such is easily retrofitted.

The object is accomplished by a boarding assembly for boarding a vehicle, a railway vehicle comprising a boarding assembly and also by a method for producing a railway vehicle according to the independent claims.

According to the invention, a boarding assembly for boarding a vehicle, in particular for boarding a railway vehicle, in particular a railway vehicle intended for passenger transport, is arranged in a mounted state outside the vehicle body. The boarding assembly is arranged in the mounted state on an outer wall of the vehicle body, in which a door is present. The boarding assembly comprises at least one first step. The first step is suspended about a first axis of rotation such that it is able to rotate in the boarding assembly. The first step is capable of displacement from a travel position, in which the first step in the mounted state is oriented parallel to the outer wall of the vehicle body, into a use position, in which the first step in the mounted state is oriented substantially perpendicularly to the outer wall of the vehicle body. The boarding assembly further comprises a pivot device having a second axis of rotation, oriented substantially parallel to the outer wall of the vehicle body in the mounted state in the travel position. The first step can be brought at least from the travel position into the use position by the pivot device. According to the invention, the pivot device in the mounted state is arranged entirely on the outside of the outer wall of the vehicle body, in particular within the boarding assembly.

An advantage is that the boarding assembly thus represents an independent structural unit, in particular independent from the vehicle. A suchlike structural unit is easily retrofitted, whereby the vehicle, including after its production, can be easily retrofitted for operation with a boarding platform located at a lower level. As a result, completed vehicles can be retrofitted in a simple manner for operation with station platforms that are located at a lower level, for example, but without a modification of the vehicle itself being necessary for that purpose. The installation of attachment means for the attachment of the boarding assembly is not regarded as modification work in this context.

The expression outer wall of the vehicle body in the context of this application relates to the side of the vehicle body wall which is oriented towards the outside. It also includes the outer wall of the vehicle body, in which passenger access doors are arranged.

The expression arranged entirely on the outside the outer wall of the vehicle body denotes that the pivot device is arranged along the outer wall of the vehicle body, and does not penetrate the plane which extends through the outer wall of the vehicle body. In particular, the expression entirely on the outside of the outer wall of the vehicle body excludes an arrangement in the interior of the vehicle or underneath the vehicle.

The expression pivot device in the context of this application denotes elements which are essential for the pivoting function. Ancillary elements, such as a switch for the electrical unlocking of the boarding assembly or a switch for starting an electric motor, for example, which sets the pivot device in movement, are not considered as a part of the pivot device and can also be positioned on the inside of the outer wall of the vehicle body, in particular in the carriage body or under the carriage body.

In a preferred embodiment, the pivot device is arranged entirely within the boarding assembly.

The expression inside the boarding assembly denotes, in the context of this application, inside a boarding assembly structural unit. The boarding assembly structural unit is capable of installation on the railway vehicle and is not a component part of the vehicle itself. The expression inside the boarding assembly thus denotes outside the vehicle carriage body.

An advantage is that the pivot device is thus entirely a part of the boarding assembly. The boarding assembly can thus be produced and installed as an independent, completed structural unit without functional contact with a part of the vehicle, apart from the attachment of the boarding assembly. As a result, only the boarding assembly structural unit must be attached to the outer wall of the vehicle body in conjunction with the retrofitting of the vehicle.

In a preferred embodiment, the boarding assembly comprises an attachment arrangement. The attachment arrangement exhibits an L-shape. In the assembled state, the attachment arrangement surrounds the outer wall of the vehicle body. Because of the L-shape of the attachment arrangement, the attachment arrangement also protrudes into the underfloor area of the vehicle.

An advantage is that the boarding assembly can thus be attached easily to the outer wall of the vehicle body by means of the attachment arrangement. This permits a particularly stable attachment of the boarding assembly.

In a preferred embodiment, the boarding assembly comprises at least one second step. The second step is suspended in the boarding assembly in such a way that it is able to rotate about a third axis. The second step is thus capable of displacement from a travel position, in which the second step in the mounted state is oriented parallel to the outer wall of the vehicle body, into a use position, in which the second step in the mounted state is oriented perpendicularly to the outer wall of the vehicle body.

An advantage is that greater differences between the exit from the vehicle and the boarding platform can thus also be overcome by means of the boarding assembly.

In a preferred embodiment, the first step and the second step are connected to each other in particular in an articulated manner.

An advantage is that, when rotating one of the two steps from the travel position into the use position or also in the course of rotation from the use position into the travel position, the other step in each case is involved in this rotation. It is only necessary, therefore, to effect the rotation of the one step, whereby the rotation the second step is then also effected.

In a preferred embodiment, the connection of the first step and the second step is performed by a connection arm. The connection arm is attached to the first step and to the second step, in particular in at least partially movable manner, preferably such that it is able to rotate and/or to slide.

An advantage is that the articulated connection between the first step and the second step is thus configured in a particularly simple and therefore cost-effective manner.

In a preferred embodiment, the first step is arranged in the assembled state underneath the second step. In the assembled state, a distance of the first step from the outer wall of the vehicle body in the use position can be greater than a distance of the second step from the outer wall of the vehicle body in the use position.

The expression distance from a step to the outer wall of the vehicle body denotes the distance between a tread surface of the step and the outer wall of the vehicle body, that is to say the distance between the end of the tread surface lying closer to the outer wall of the vehicle body and the outer wall of the vehicle body.

An advantage is that the boarding assembly is thus configured as a stairway and not as a ladder. The boarding assembly thus makes it possible to overcome not only a difference in height between the exit from the vehicle and the boarding platform, but also a lateral distance between the outer wall of the vehicle body and the boarding platform.

In one embodiment, a first rotating shaft is configured about the first axis of rotation in such a way that a rotational movement of the first rotating shaft leads to a folding-in/folding-out movement at least of the first step.

In a preferred embodiment, a second rotating shaft of the second axis of rotation is configured about the pivot device in such a way that a rotational movement of the pivot device leads to a folding-in/folding-out movement at least of the first step.

In a preferred embodiment, the first rotating shaft and/or the second rotating shaft is suspended in the boarding assembly in such a way that it is able to rotate.

In one embodiment, the first rotating shaft and the second rotating shaft are connected by a connecting device, so that a turning moment of the second rotating shaft results in a turning moment of the first rotating shaft.

The connecting device can be embodied, for example, in the form of a bevel gear respectively on the first rotating shaft and on the second rotating shaft. The bevel gears are connected to the respective shaft in a rotationally fixed manner. Thus, the bevel gears together form a connecting device and permit the transfer of a turning moment from one of the shafts to the other shaft.

For example, the bevel gear of the second rotating shaft transmits the turning moment of the second rotating shaft to the bevel gear of the first rotating shaft and, as a result, to the first rotating shaft. The bevel gears can exhibit teeth, grooves or similar for this purpose, wherein the teeth of the first bevel gear engage in the teeth of the second bevel gear and, in so doing, permit the transfer of the turning moment. The teeth are preferably configured in a transmission ratio of one to one. A 90° rotation of the second rotating shaft thus results in a 90° rotation of the first rotating shaft. Other transmission ratios are conceivable, of course. Further connecting devices that are familiar to a person skilled in the art may also find an application.

An advantage is that the rotational movement of the first step via the pivot device is facilitated in this way. No actuation of the first step itself is thus necessary for folding-in or folding-out of the first step. The folding-in or folding-out movement can be effected by a separate unit, specifically the pivot device. The step and in particular the tread surface of the step, which may be dirty under certain circumstances, thus need not be touched in the course of manual folding-in or folding-out.

In one embodiment, the connection between the pivot device and the first step is implemented electrically, wirelessly via radio and/or optically. Actuation of the pivot device produces a signal, which is conveyed via the connection to a drive element, in particular to an electrical machine, wherein the drive element by reason of the signal causes a folding-in or folding-out movement of at least the first step, and preferably all the steps.

An advantage is that the mechanical connecting device is redundant and the rotating shafts are at least partially redundant. The boarding assembly can thus be of more cost-effective configuration.

In a preferred embodiment, the pivot device has a pivoting wing.

The pivoting wing can be connected to the second rotating shaft. The pivoting wing can be configured in such a way that it forms a part of the boarding assembly.

An advantage is that the second rotating shaft of the pivot device is caused to rotate by rotation of the pivoting wing. The pivoting wing acts as a lever on the second rotating shaft and, in so doing, permits easy manual actuation of the pivot device.

In one embodiment, the movement of the pivot device is effected by a signal generator and a drive element with a signal receiver, in particular a switch and an electrical machine.

An advantage is that the pivot device can thus be displaced by actuation of the signal generator.

In an especially preferred embodiment, in the mounted state, a surface of the pivoting wing is oriented parallel to the outer wall of the vehicle body in the travel position and is oriented perpendicularly to the outer wall of the vehicle body in the use position. The pivoting wing in the use position directly adjoins a boarding area constituted by the first step.

The surface of the pivoting wing should be understood in the context of this application to be the pivoting wing defined by the extremities of the principal surface, that is to say the largest surface in terms of its area. It does not denote the smaller surfaces in terms of their area that are present under certain circumstances and are oriented at an angle to the principal surface. In particular, it does not denote the surfaces at the extremities that are oriented substantially at 90° to the principal surface under certain circumstances, which surfaces form a rectangular block from the wing that is open on one side.

The pivoting wing can be configured as a metal sheet positioned on the second rotating shaft.

The pivoting wing in the use position is thus able to cover a part of the boarding assembly, in particular the pivot device, by the surface of the pivoting wing.

In the use position, the surface of the pivoting wing can thus be oriented laterally along the first step and, as a result, is able to delimit the boarding area laterally.

The boarding area is understood to be a corridor, which in its width corresponds to the widest step the boarding assembly and leads from the boarding platform to the vehicle door.

An advantage is that the pivoting wing delimits the boarding assembly laterally in the use position. The pivoting wing thus represents a kind of staircase side wall for the first step. The safety of the boarding assembly is increased by this staircase side wall, because slipping sideways from the boarding assembly is more difficult. The pivoting wing is thus able to increase the safety of the boarding assembly in the use position.

In an especially preferred embodiment, the pivoting wing has a handle.

An advantage is that the pivoting wing is thus capable of being displaced simply by gripping the handle manually. This permits simple manual actuation of the pivot device by pulling on the handle of the pivoting wing. The first step can thus be brought from the travel position into the use position as the vehicle arrives at the boarding platform, wherein for this purpose only the personnel on the boarding platform are required to bring the pivoting wing from the travel position into the use position by pulling on the handle.

Pulling on the handle denotes the movement of the handle along a circular path about the second axis of rotation, wherein the circular path is defined by the pivoting wing and the second axis of rotation.

The handle in the use position can also be used as an entry aid by passengers for the purpose of boarding the vehicle. This is particularly useful if the first step in its use position exhibits a certain difference in height to the station platform, because the passengers are thus able to overcome this difference in height more easily by gripping the handle.

In a preferred embodiment, the pivoting wing has a further, pull-out or extendable handle. The handle is configured in such a way that, in the pulled-out or in the extended state, it is capable of being used as a hand rail of the boarding assembly.

An advantage is that the hand rail increases the safety of the boarding assembly, because passengers are able to hold onto a hand rail on boarding the vehicle.

The handle is preferably arranged on the inside of the pivoting wing.

The inside of the pivoting wing is the side of the pivoting wing facing the outer wall of the railway vehicle body in the travel position.

The handle thus rotates with the pivoting wing into the travel position and is present close to the boarding area of the boarding assembly. The handle positioned on the inside of the pivoting wing is covered by the pivoting wing in the travel position.

As an alternative or in addition, the handle is arranged on the boarding assembly, in particular as close as possible to the boarding area.

The pivot device preferably comprises at least a second rotating shaft, a connecting device for connecting the second rotating shaft to the first rotating shaft, a pivoting wing, wherein the pivoting wing in each case is connected to the second rotating shaft, a handle, which is positioned on the pivoting wing and a retractable or extendable handle, which is positioned on the inside of the pivoting wing.

A boarding assembly preferably comprises two pivot devices. Both pivot devices are connected by the respective connecting devices to a common rotating shaft of the first step. The two pivot devices are thus connected to one another by means of the common first rotating shaft. A rotational movement of one of the pivot devices results in the rotational movement at least of the first step, and preferably also in the rotational movement of the second and third step, and in the rotational movement of the second pivot device.

The boarding assembly preferably comprises a drive for driving the first rotating shaft. The boarding assembly is thus capable of being brought from the travel position into the use position by the drive, but without a manual actuation of the pivot device by the personnel on the boarding platform being required for this purpose. The drive can drive the first and/or second rotating shaft. The drive can be an electric, hydraulic and/or pneumatic drive.

The boarding assembly preferably comprises a second and a third electrical machine, wherein, in each case, one of these machines is accommodated in one of the pivoting wings of the boarding assembly and causes the retraction or the extension of the handle. The boarding assembly, including the handles, can thus be displaced conveniently from the travel position into the use position without manual actuation by controlling the electric motors. In the case of the retrofitted vehicle, the boarding assembly or the multiple boarding assemblies can thus be displaced from the travel position into the use position, if required at the touch of a button.

Preferably all rotating shafts, that is to say the first rotating shaft (first step), the second rotating shaft (pivot device), the third rotating shaft (second step), and the fourth rotating shaft (third step), are oriented parallel to the outer wall of the vehicle body.

The first rotating shaft, the third rotating shaft and the fourth rotating shaft are oriented preferably parallel to each other, whereas the second rotating shaft is oriented preferably perpendicularly to the other shafts.

The object is likewise accomplished by a railway vehicle, in particular a railway vehicle intended for passenger transport. The railway vehicle comprises a railway vehicle body having an outer wall of the railway vehicle body. A door is positioned in the outer wall of the railway vehicle body. The railway vehicle further comprises a boarding assembly as described above.

An advantage is that the railway vehicle is thus able to serve station platforms of different heights, and the passengers are able to alight and board respectively without difficulty including in the case of low station platforms. The vehicle is able to serve a first, high platform by means of its usual exit, that is to say without making use of the boarding assembly. The vehicle is able to serve a second, lower platform by means of the boarding assembly. This is facilitated by at least the first step of the boarding assembly being folded out after arriving at the platform, that is to say being displaced from the travel position into the use position. A stairway which overcomes the difference in height between the second, lower platform and the usual exit from the railway vehicle is formed in this way.

A particular advantage is that the boarding assembly can be installed in the railway vehicle retrospectively as an independent structural unit, without the need for changes to the railway vehicle itself. This permits the easy retrofitting of the railway vehicle with the boarding assembly.

The object is likewise accomplished by a method for the retrofitting of a railway vehicle, in particular a railway vehicle as described previously. The method comprises the following steps:
provision of a boarding assembly as described previously;
installation of the boarding assembly on an outer wall of the railway vehicle body by the attachment of the boarding assembly at least on the outer wall of the railway vehicle body.

In a preferred embodiment, the method comprises the additional attachment of the boarding assembly to the underside of the vehicle.

An already completed railway vehicle can thus be retrofitted with a boarding assembly by the method. Only the boarding assembly must be attached to the railway vehicle body for this purpose. No functional connections between the vehicle and the boarding assembly are necessary.

The object is likewise accomplished by a method for the operation of the boarding assembly as described previously. The method comprises the following steps:
actuation the pivot device for the rotation of at least the first step from the travel position into the use position;
in particular extension of the handle from the boarding assembly;
in particular retraction of the handle into the boarding assembly;
in particular actuation the pivot device for the rotation of the first step from the use position into the travel position.

The method thus permits simple use of the boarding assembly.

Figure 2:
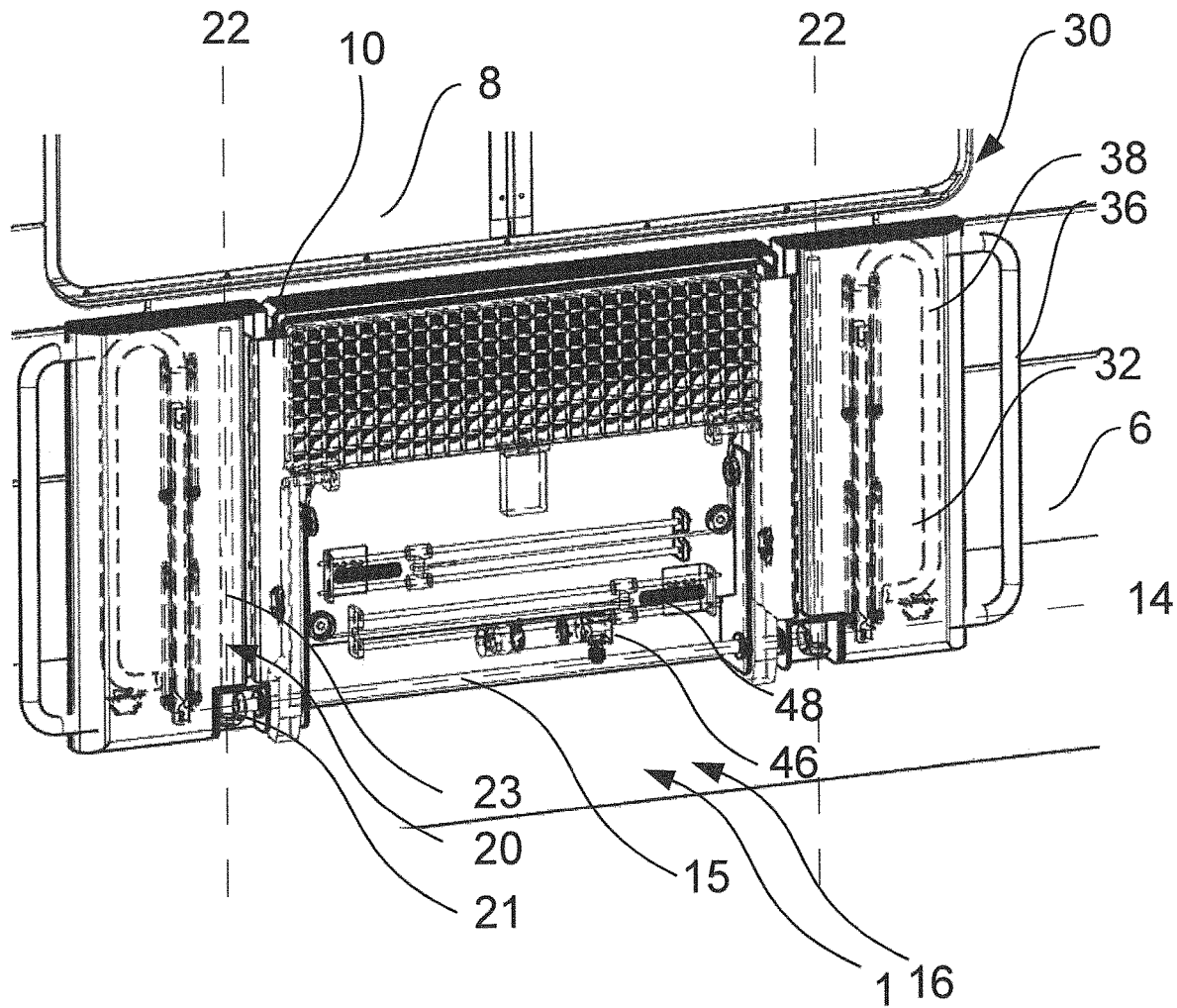
Figure 3:
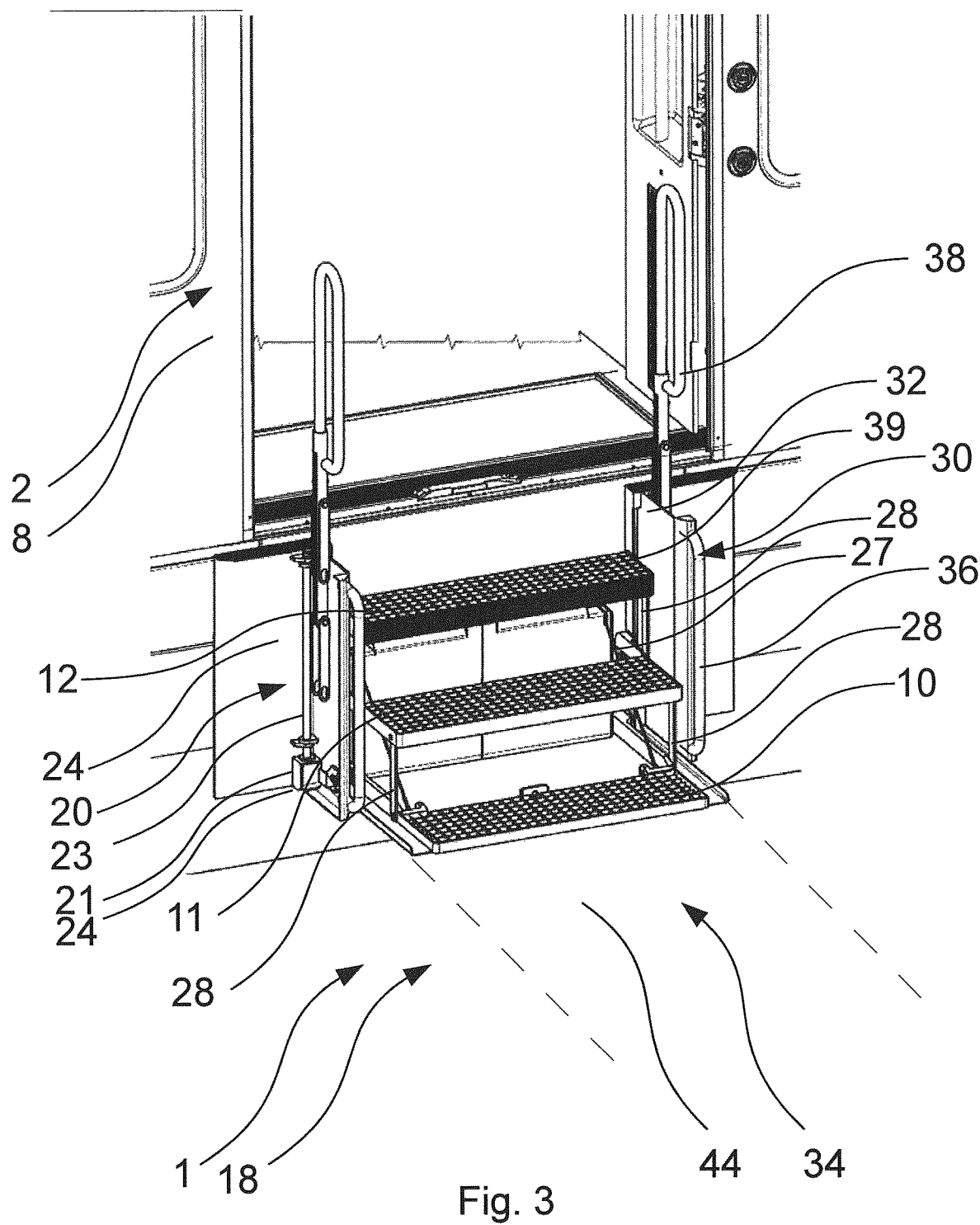
Figure 4:
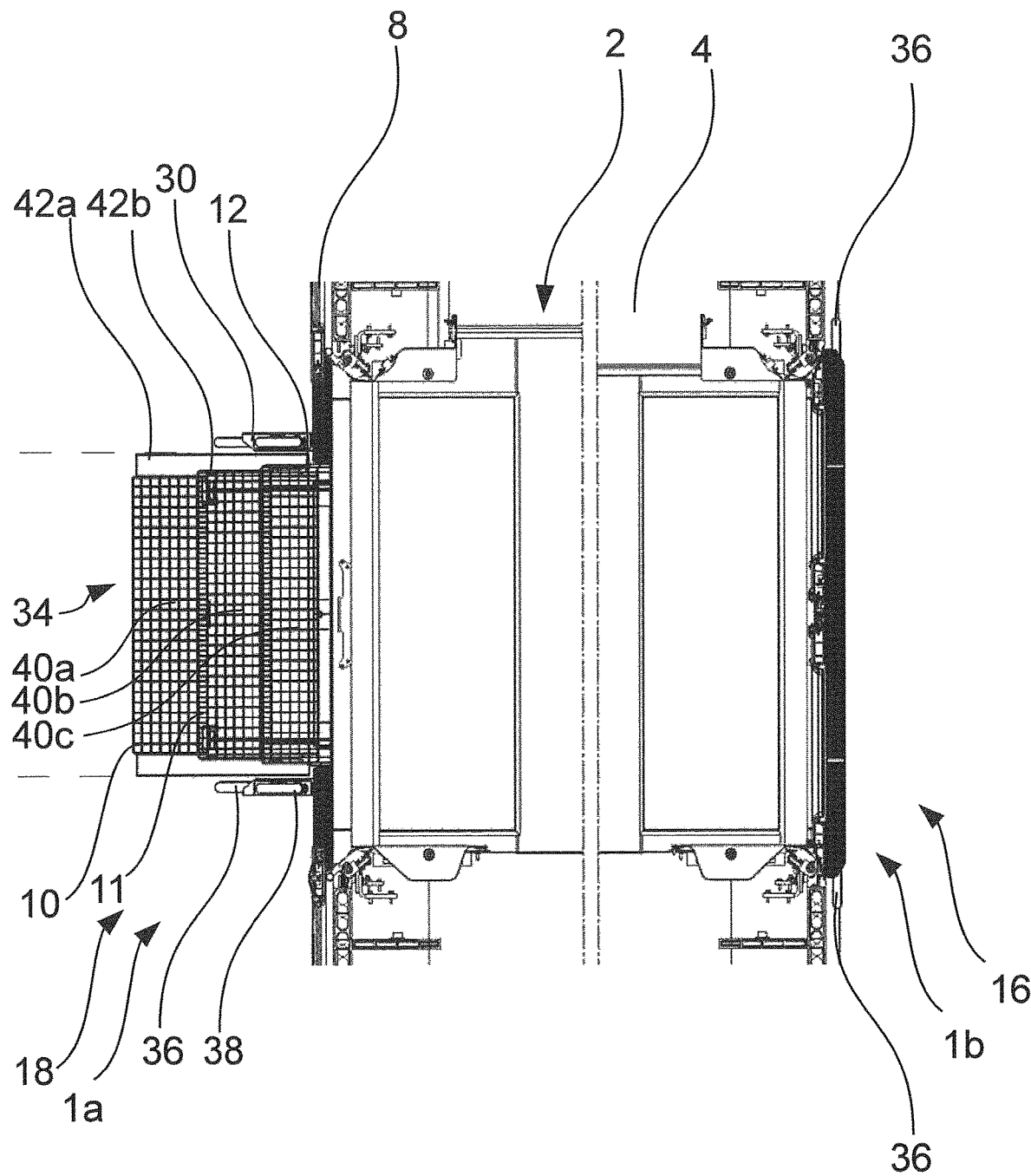

The invention is explained in more detail in the figures in the following illustrative embodiments attached hereto. In the figures:

FIG. 1: depicts a perspective representation of a railway vehicle having a boarding assembly;

FIG. 2: depicts a schematic representation of one of the boarding assemblies in FIG. 1, wherein certain parts of the attachment arrangement are not represented and parts behind the pivoting wings are represented with broken lines;

FIG. 3: depicts a schematic representation of the boarding assembly in FIG. 2 in the use position;

FIG. 4: depicts a schematic representation of a top view of the railway vehicle having two boarding assemblies, wherein a first boarding assembly (left) is in the use position and a second boarding assembly (right) is in the travel position.

FIG. 1 depicts a railway vehicle 2. The railway vehicle 2 comprises a boarding assembly 1. The boarding assembly 1 is attached to an outer wall 6 of the railway vehicle body by an attachment arrangement 24. The attachment arrangement 24 is configured in an L-shape (not depicted) and is oriented on the outer wall 6 of the railway vehicle body as well as under the railway vehicle 2 (not depicted). The boarding assembly 1 can be moved from the travel position 16 depicted in FIG. 1 into a use position 18 (see FIG. 2). In the travel position 16, a first step 10 of the boarding assembly 1 is oriented parallel to the outer wall 6 of the railway vehicle body. In addition, the boarding assembly 1 has a first pivoting wing 30 and a second pivoting wing 30. The pivoting wings 30 in each case have a pivoting wing surface 32 and comprise a handle 36. The pivoting wing 30 is oriented parallel to the outer wall 6 of the railway vehicle body in the travel position 16.

FIG. 2, on the other hand, depicts the boarding assembly 1 in the travel position 16, wherein a central part of the attachment arrangement 24, as well as a cover plate of the attachment arrangement 24 (see FIG. 1) are not represented, and parts behind the pivoting wings are represented with broken lines. A handle 38 is identifiable. The handle 38 is retracted behind the pivoting wing and is positioned on the pivoting wing 30. In the travel position 18, the handle 38 is thus covered by the pivoting wing 30.

FIG. 2 further depicts a first rotating shaft 15, on which the first step 10 is rotatably mounted. The first rotating shaft 15 is connected by means of a connecting device 21 having a pivot device 20. The pivot device 20 comprises a second rotating shaft 23, which is oriented parallel to the outer wall 6 of the railway vehicle body and is rotatably suspended in the boarding assembly 1. The first rotating shaft 15 and the second rotating shaft 23 are connected to one another by means of the connecting device 21 in such a way that a rotation the second rotating shaft 23 leads to a rotation of the first rotating shaft 15. The connecting device 21 is present in the attachment arrangement 24 and is surrounded by it. The second rotating shaft 23 is connected to the pivoting wing 30. The pivoting wing 30 in turn is suspended in the attachment arrangement 24 in such a way that it is able to rotate. The pivoting wing 30 can be rotated by the handle 36. By means of the second rotating shaft 23 of the pivot device 20 and the connecting device 21, this rotation of the pivoting wing 30 leads to a rotation of the first rotating shaft 15 and thus to a folding-out or folding-in movement of the first step 10. The first step 10 can thus be folded out by actuation of the handle 36, that is to say moved from the travel position 16 into the use position 18. The first step 10 can then be folded in once more by turning back the pivoting wing 30 by means of the handle 36, that is to say moved from the use position 18 into the travel position 16.

Further depicted in FIG. 2 is a drive 46 for driving the first rotating shaft 15. The drive 46 produces a rotational movement of the first rotating shaft 15 and thus also a rotational movement of the first step 10. A rotational movement of the second rotating shaft 23, and thus of the pivoting wing 30, is also caused by means of the connecting device 21. The need for the manual actuation of the pivoting wing 30 thus no longer applies. The drive 46 is executed as an electric motor. FIG. 2 further depicts a tensioning cable having a return spring 48. The tensioning cable is extended from the travel position 16 into the use position 18 in conjunction with the movement of the pivoting wing 30, and the return spring is tensioned in the process. In conjunction with the movement of the pivoting wing 30 from the use position 18 into the travel position 16, the movement is supported by the tensioning cable with a return spring 48.

FIG. 3 depicts the boarding assembly 1 in the use position 18. In this position 18, the boarding assembly 1 forms a boarding area 34 in which passengers are able to board from a boarding platform 44 into the railway vehicle 2, or to alight from the railway vehicle 2 onto the boarding platform 44.

The boarding assembly 1 has a second step 11 and a third step 12 in addition to the first step 10. The second step 11 is supported in the boarding assembly 1 in such a way that it is able to rotate by means of a third rotating shaft 27. The third step 12 is also suspended by means of a further, separate rotating shaft 39 in such a way that it is able to rotate in the boarding assembly 1. The three steps 10, 11, 12 are connected to one another by the connecting arms 28. The rotating shafts 15, 27, 39 are in a parallel relationship and are oriented substantially parallel to the outer wall 6 of the railway vehicle body and substantially perpendicularly to the second rotating shafts 23 of the pivot devices 20.

The surfaces of the pivoting wing 32 in the use position 18 constitute a lateral boundary of the boarding areas 34 and, as such, form a kind of staircase. In this position, the surfaces of the pivoting wing 32 are oriented substantially perpendicularly to the outer wall 6 of the railway vehicle body.

The handle 38 can be extended in the use position 18, as depicted in FIG. 3. The handle 38 constitutes a hand rail for the boarding assembly 1. The handle 38 is capable of being retracted into the pivoting wing 30 in order to accommodate the handle 38 within the boarding assembly 1 in the travel position 16.

In FIG. 3, the pivot device 20 with its second rotating shaft 23 is visible (see the left-hand pivoting wing 30). The second rotating shaft 23 is connected to the first rotating shaft 15 via the connecting device 21. The connecting device 21 in FIG. 3 is covered by the attachment arrangement 24 and is not visible.

FIG. 4 depicts a railway vehicle in a top view and a first boarding assembly 1a (left) in the use position 18 and a second boarding assembly 1b (right) in the travel position 16. The first boarding assembly 1a constitutes a boarding area 34.

A tread surface 40c of the third step 12 of the boarding assembly 1 begins in the use position 18 directly on the outer wall 6 of the railway vehicle body. The second step 11 has a first step arm 42b and a second step arm 42b in addition to a tread surface 40b. As a result, a tread surface 40b of the second step 11, viewed from above, begins directly after the tread surface 40c of the third step 12. The first step 10 also has a first step arm 42a and a second step arm 42a, so that a tread surface 40a of the first step 10, viewed from above, begins directly after the tread surface 40b of the second step 11. The tread surface 40a of the first step 10 in the operating state 18 is situated further from the outer wall 6 of the railway vehicle body by the same distance as the tread surface 40b of the second step 11. The tread surface 40b of the second step 11 in the use position is situated further from the outer wall 6 of the railway vehicle body than the tread surface 40c of the third step 12, which begins directly on the outer wall 6 of the railway vehicle body.

The first step 10 in this case lies at the lowest level, wherein the second step 11 lies above the first step 10. The third step 12 lies above the second step 11. The steps in the use position 18 thus constitute a stairway intended to overcome any difference in height between the door of the railway vehicle 2 and a boarding platform.

The first step arm 42a and the second step arm 42a of the first step 10 delimit the boarding area 34 formed by the boarding assembly 1 in the use position 18. This boarding area 34 is likewise delimited laterally by the surfaces 32 of the pivoting wing 30. These surfaces 32 thereby prevent slipping from the third step 12 and, in so doing, increase the safety of the boarding assembly 1.

The invention claimed is:

1. A boarding assembly for boarding a railway vehicle wherein said boarding assembly, in a mounted state, is arranged outside the vehicle body on an outer wall of the vehicle body, a door is positioned in the outer wall, the boarding assembly comprising at least:
   a first step being suspended in the boarding assembly such that the first step is rotatable about a first axis of rotation, whereby the first step is capable of being displaced from a travel position into a use position, the first step in the mounted state, in the travel position is oriented parallel to the outer wall of the vehicle body, the first step, in the mounted state, in the use position is oriented substantially perpendicularly to the outer wall of the vehicle body;
   the boarding assembly further comprising:
   a pivot device having a second axis of rotation oriented substantially parallel to the outer wall of the vehicle body in the mounted state in the travel position, wherein the first step is capable of being displaced by the pivot device at least from the travel position into the use position,
   wherein
   the pivot device, in the mounted state, is arranged entirely on the outside of the outer wall of the vehicle body.

2. The boarding assembly as claimed in claim 1, wherein the pivot device is arranged entirely within the boarding assembly.

3. The boarding assembly as claimed in claim 1, wherein the boarding assembly comprises an attachment arrangement, which exhibits an L-shape and, in the mounted state, surrounds the outer wall of the vehicle body.

4. The boarding assembly as claimed in claim 1, wherein the boarding assembly comprises at least a second step, wherein the second step is suspended about a third axis of rotation in such a way that the second step is able to rotate in the boarding assembly and is capable as such of displacement from a travel position, in which the second step, in the mounted state, is oriented parallel to the outer wall of the vehicle body, into a use position, in which the second step, in the mounted state, is oriented perpendicularly to the outer wall of the vehicle body.

5. The boarding assembly as claimed in claim 4, wherein the first step and the second step are connected to each other.

6. The boarding assembly as claimed in claim 5, wherein the first step and the second step are connected to each other in an articulated manner.

7. The boarding assembly as claimed in claim 5, wherein the connection of the first step and the second step is implemented by a connection arm, and the connection arm is attached to the first step and to the second step.

8. The boarding assembly as claimed in claim 7, wherein the connection arm is attached in such a way that the connection arm is able to at least one of rotate or slide.

9. The boarding assembly as claimed in claim 7, wherein the connection arm is attached to the first step and to the second step in an at least partially moveable manner.

10. The boarding assembly as claimed in claim 4, wherein the first step, in the mounted state, is arranged underneath the second step, and, in the mounted state, a distance of the first step from the outer wall of the vehicle body in the use position is greater than a distance of the second step from the outer wall of the vehicle body in the use position.

11. The boarding assembly as claimed in claim 1, wherein a rotating shaft of the pivot device is configured about the second axis of rotation in such a way that a rotational movement of the pivot device leads to a folding-in/folding-out movement at least of the first step.

12. The boarding assembly as claimed in claim 11, wherein the pivot device has a pivoting wing.

13. The boarding assembly as claimed in claim 12, wherein, in the mounted state, a surface of the pivoting wing is parallel to the outer wall of the vehicle body in the travel position and is perpendicular to the outer wall of the vehicle body in the use position, and the pivoting wing in the use position directly adjoins a boarding area formed by the first step.

14. The boarding assembly as claimed in claim 12, wherein the pivoting wing has a handle.

15. The boarding assembly as claimed in claim 12, wherein the pivoting wing has a pull-out or extendable handle, which is configured in such a way that the handle is capable, in the pulled-out or extended state, of being used as a hand rail for the boarding assembly.

16. A railway vehicle comprising:
a railway vehicle body having an outer wall of the railway vehicle body, in which a door is positioned; and
a boarding assembly as claimed in claim 1.

17. A method for retrofitting a railway vehicle as claimed in claim 16, wherein the method comprises the following steps:
providing the boarding assembly;
installing the boarding assembly on an outer wall of the railway vehicle body by the attachment of the boarding assembly at least to the outer wall of the railway vehicle body.

18. The method for the operation of a boarding assembly as claimed in claim 1, comprising the following steps:
actuation of the pivot device for rotation at least of the first step from a travel position into a use position.

19. The method as claimed in claim 18, wherein the method comprises the steps:
extending a handle from the boarding assembly; and
retracting the handle into the boarding assembly.

20. The boarding assembly as claimed in claim 1, wherein the pivot device, in the mounted state, is arranged entirely within the boarding assembly.

* * * * *